United States Patent [19]

Okumura et al.

[11] Patent Number: 4,668,401
[45] Date of Patent: May 26, 1987

[54] HOLLOW-FIBER FILTER MODULE AND FILTRATION METHOD USING THE SAME

[75] Inventors: Munehiro Okumura, Hoya; Kazuo Kuwahara, Tokyo; Masujiro Arita, Tokyo; Shingo Mori, Tokyo; Tetsuya Ohmura, Yokohama; Osamu Yamamoto, Tokyo; Shinichi Ishii, Hachioji, all of Japan

[73] Assignees: Mitsubishi Rayon Co., Ltd.; Mitsubishi Rayon Engineering Co. Ltd., both of Tokyo, Japan

[21] Appl. No.: 875,728

[22] Filed: Jun. 18, 1986

[30] Foreign Application Priority Data

Jun. 19, 1985 [JP] Japan .................................. 60-133370
Dec. 6, 1985 [JP] Japan .................................. 60-274690

[51] Int. Cl.[4] .................................................. B01D 13/01
[52] U.S. Cl. ........................... 210/650; 210/433.2; 210/456; 210/806; 55/16; 55/158
[58] Field of Search .............. 210/321.1, 321.2, 321.3, 210/323.3, 336, 340, 433.2, 456, 500.23, 650, 806; 55/16, 158

[56] References Cited

U.S. PATENT DOCUMENTS 4,451,369  5/1984  Sekino et al. ................. 210/321.1
4,605,500  8/1986  Takemura et al. ............. 210/321.1

FOREIGN PATENT DOCUMENTS 095121  8/1973  Japan .

Primary Examiner—Richard V. Fisher
Assistant Examiner—Jeffrey W. Peterson
Attorney, Agent, or Firm—Oblon, Fisher, Spivak, McClelland & Maier

[57] ABSTRACT

The present invention provides a hollow-fiber filter module comprising a straight tube, a bundle of hollow fibers having at least a part thereof disposed within the straight tube, a fastening member for bundling and fixing the open ends of the hollow fibers, and at least a branch tube having an end protruding to the outside of the straight tube, that surface of the fastening member which includes the open ends of the hollow fibers being attached to the branch tube in a fluid-tight manner, as well as a filtration method in which a plurality of such hollow-fiber filter modules are connected in series to form a filter module assembly and a fluid to be treated is filtered by utilizing one end of the connected straight tubes of the assembly as an inlet for the fluid to be treated, the other end thereof as an outlet for the fluid to be treated, and the branch tube of each module as an outlet for the filtered fluid.

This hollow-fiber filter module has a simple construction, causes only a slight pressure loss of the fluid to be treated, and is suitable for use in the treatment of fluids by cross flow filtration.

12 Claims, 20 Drawing Figures

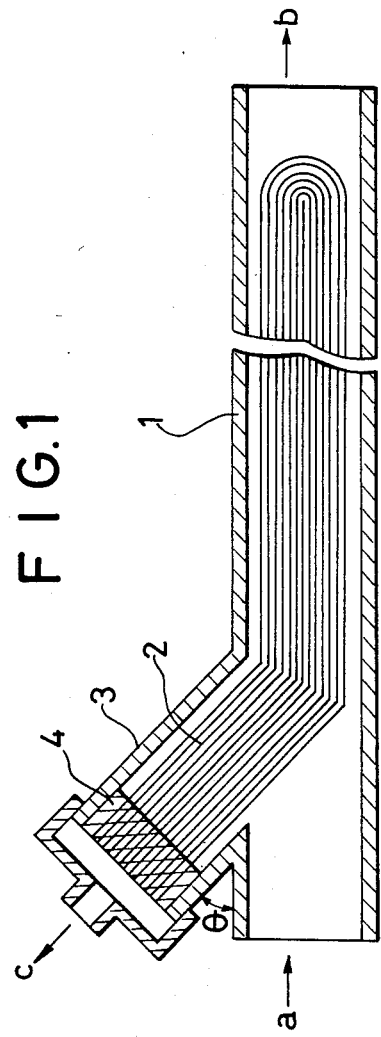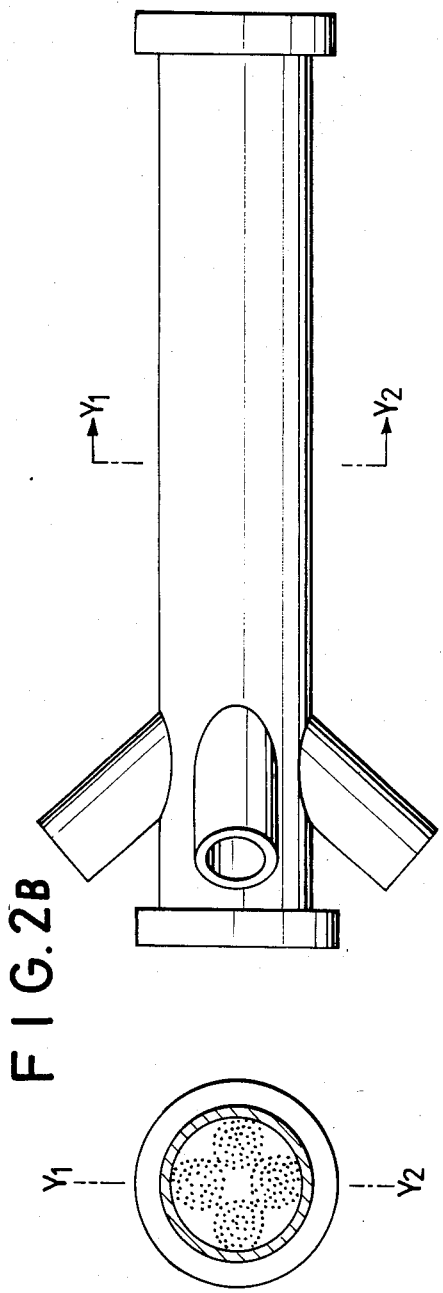

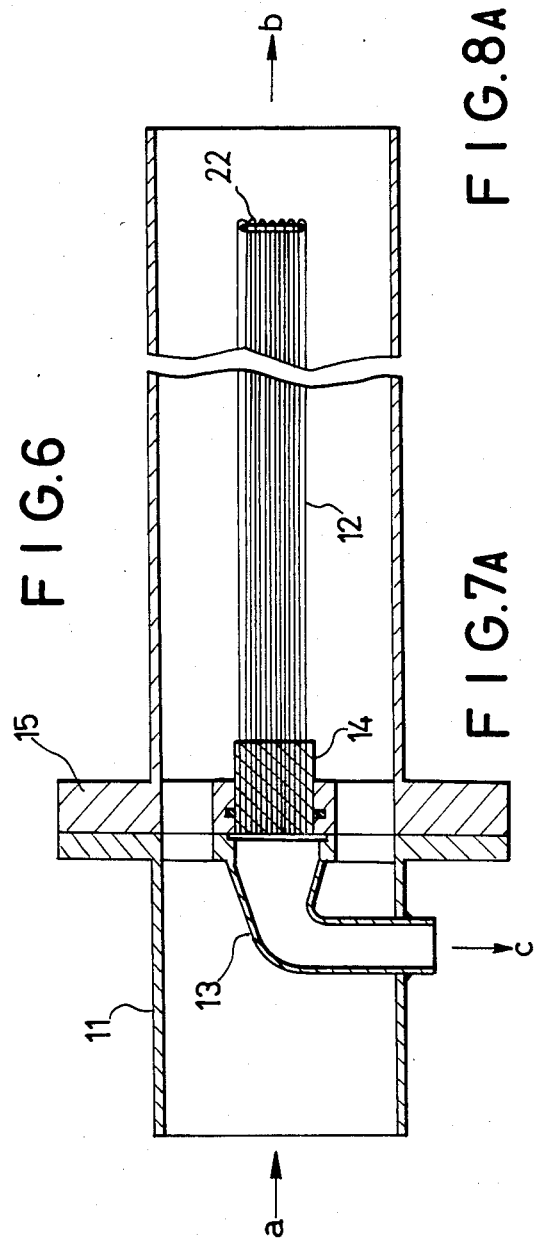
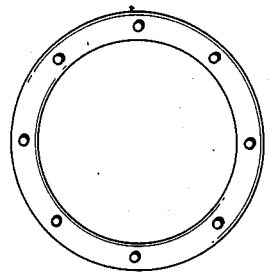
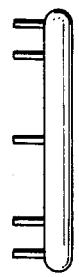
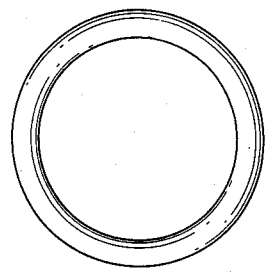

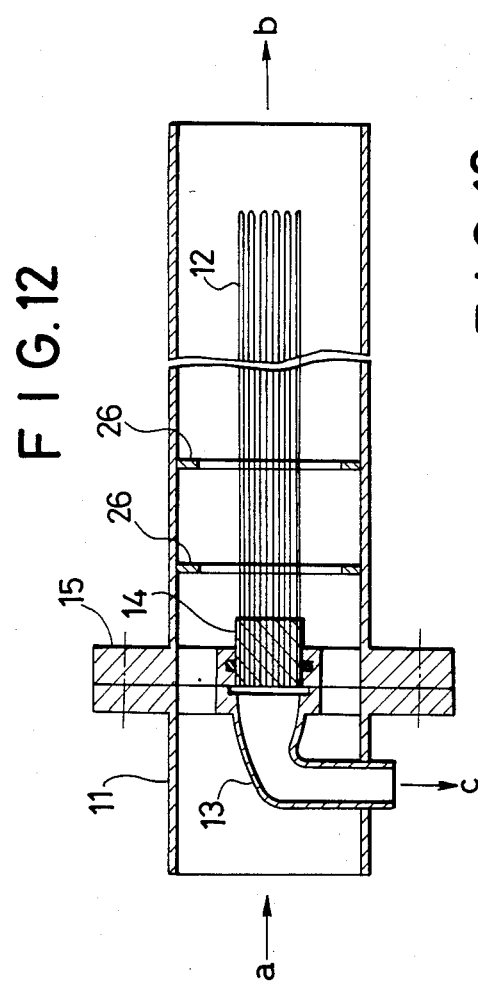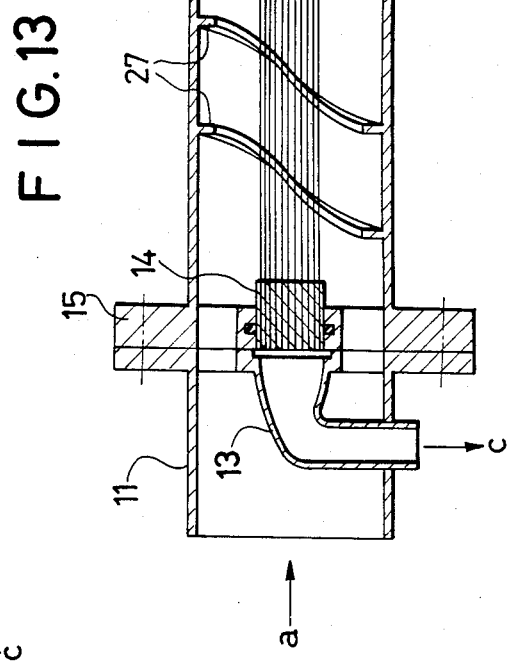

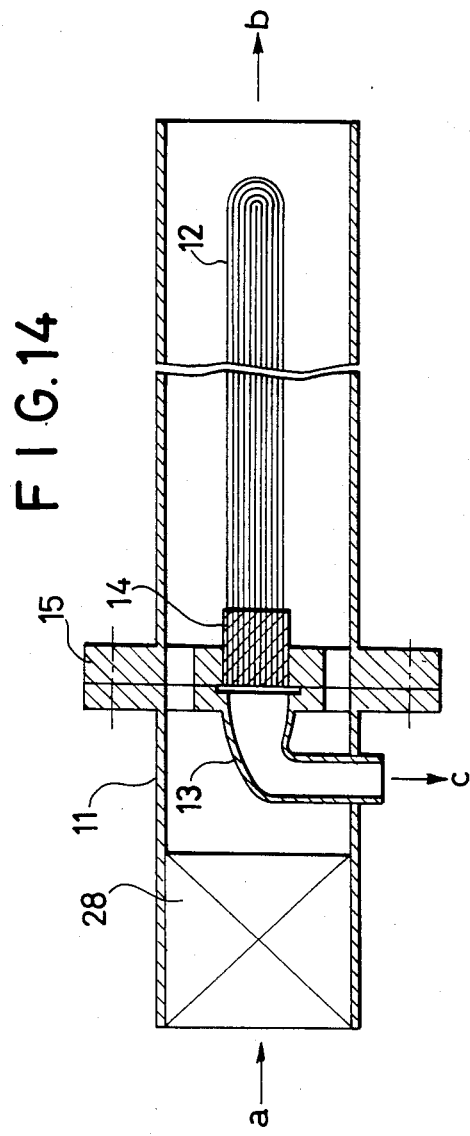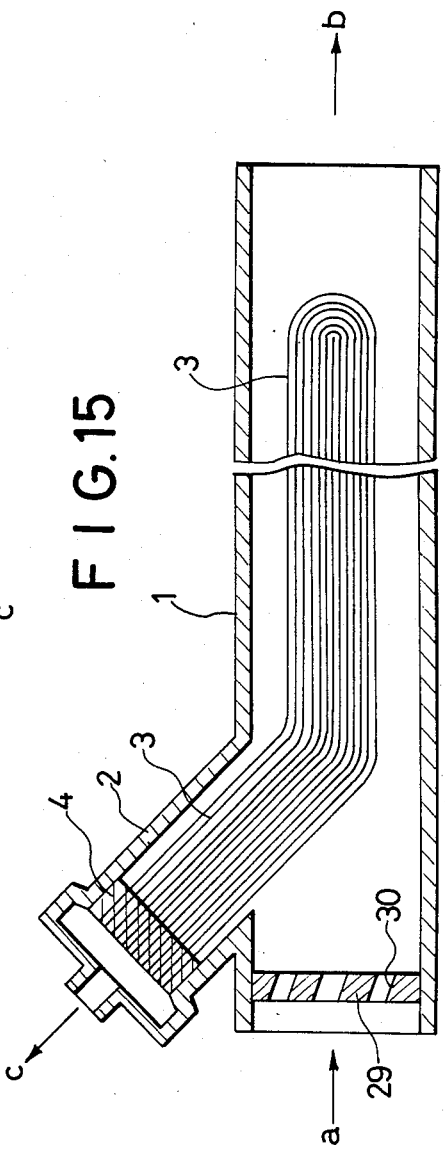

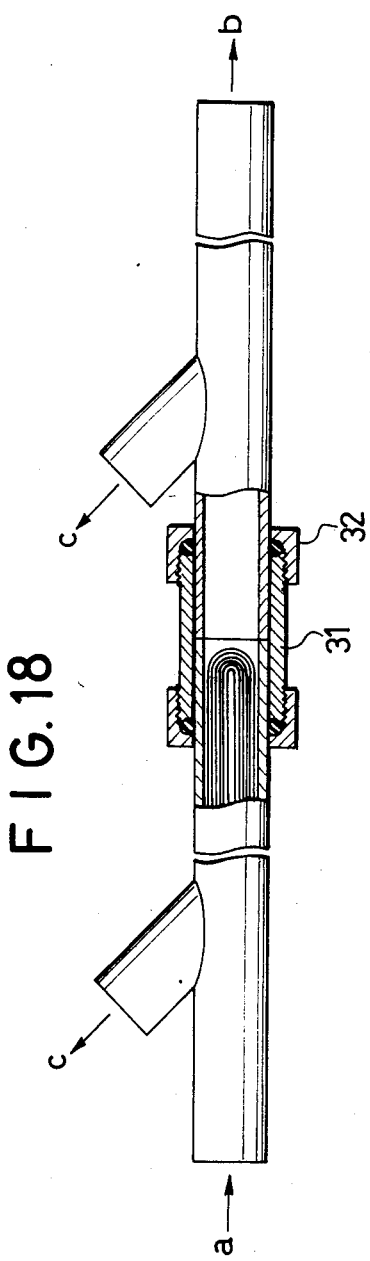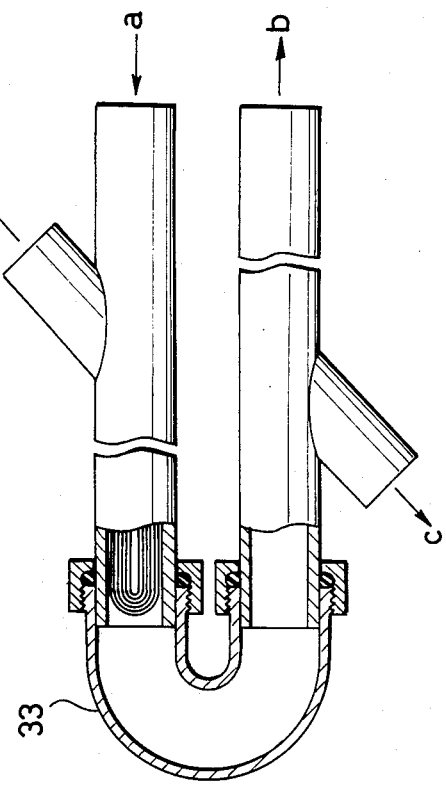

HOLLOW-FIBER FILTER MODULE AND FILTRATION METHOD USING THE SAME

BACKGROUND OF THE INVENTION

1. Field of the Invention

This invention relates to a hollow-fiber filter module for use in the filtration of fluids and a filtration method using the same. More particularly, it relates to a hollow-fiber filter module suitable for such purposes as the treatment of large volumes of water containing suspended matter and the removal of suspended dust from air, as well as a filtration method using a plurality of such modules connected in series.

2. Description of the Prior Art

Hollow-fiber filter membranes have excellent filtering performance and, moreover, enable a large area of filter membrane to be contained in a unit volume. Thus, they have conventionally been used for a wide variety of purposes including the preparation of highly purified drinking water, sterile water for medical use, and the like.

There are two types of hollow-fiber filter modules incorporating such hollow fibers. One type of module filters a fluid from the inside to the outside of the hollow fibers, while the other type filters a fluid from the outside to the inside of the hollow fibers. In modules of the former type, however, the hollow fibers have high resistance to passage of the fluid to be treated. Moreover, suspended matter and other impurities in the fluid to be treated tend to remain in the bore of the hollow fibers and cause clogging thereof, and it is difficult to restore their filtering function. For these reasons, modules of the latter type have generally been used in the treatment of water for various purposes.

On the other hand, there are two known filtration methods: the full flow filtration method in which all of the fluid to be treated is filtered through a module and recovered as a purified fluid, and the cross flow filtration method based on the cross-flow technique. The latter filtration method has the advantage that, even if the fluid to be treated contains suspended matter at high concentrations, it can be filtered at a high rate.

However, most conventional hollow-fiber filter modules have been constructed in such a way that hollow fibers are installed within a straight tube and an inlet and an outlet for the fluid to be treated are provided in the sidewall of the straight tube. This construction is more suitable for use in the full flow filtration method, rather than in the partial filtration method. For example, when a conventional hollow-fiber filter module is used in the treatment of water by partial filtration, the water to be treated forms a unidirectional stream flowing from its inlet toward its outlet and traversing the hollow fibers of the module installed in the water purifier. Accordingly, if the flow velocity of the water to be treated is increased, the hollow fibers undergo an unduly high stress in only one direction and, therefore, tend to become damaged.

Moreover, where it is desired to treat large volumes of water on an industrial scale, the inadequate capacity of a single hollow-fiber filter module makes it necessary to use a plurality of such modules connected in series or in parallel. However, when a plurality of modules connected in series are used, it is unavoidable to employ a connection system in which the water to be treated flows along a complicatedly winding path. This is disadvantageous in that the flow path causes a significant pressure loss of the water to be treated, an unduly high pumping capacity is required, the number of modules usable in connection is limited, and a great loss of energy results.

SUMMARY OF THE INVENTION

It is an object of the present invention to provide a hollow-fiber filter module having a novel construction in which the fluid to be treated suffers only a little pressure loss and the hollow fibers do not undergo significant stress even at high flow velocities of the fluid to be treated.

It is another object of the present invention to provide a hollow-fiber filter module having a construction suitable for use in the treatment of water by cross flow filtration.

It is still another object of the present invention to provide a hollow-fiber filter module which makes it possible to connect a plurality of such modules in series to form a filter module assembly suitable for use in the treatment of water on an industrial scale.

It is a further object of the present invention to provide a filtration method in which a fluid is treated by use of a plurality of such hollow-fiber filter modules connected in series.

According to the present invention, there is provided a hollow-fiber filter module comprising (a) a straight tube, (b) a bundle of hollow fibers arranged in a U-shaped pattern and/or a bundle of hollow fibers each having a closed end, at least a part of the bundle of hollow fibers being disposed within the straight tube so as to be substantially parallel to the straight tube, (c) a fastening member for bundling and fixing the hollow fibers with their open ends kept clear, and (d) at least a branch tube having an end protruding to the outside of the straight tube, that surface of the fastening member which includes the open ends of the hollow fibers being attached to the branch tube in a fluid-tight manner.

According to the present invention, there is also provided a filtration method comprising the steps of (A) providing a plurality of hollow-fiber filter modules as described above, (B) connecting the modules in series through the ends of the straight tubes to form a filter module assembly, and (C) filtering a fluid to be treated, by utilizing one end of the connected straight tubes of the assembly as an inlet for the fluid to be treated, the other end of the connected straight tubes of the assembly as an outlet for the fluid to be treated, and the outer end of the branch tube of each module as an outlet for the filtered fluid.

BRIEF DESCRIPTION OF THE DRAWINGS

FIGS. 1 and 3 are partially cutaway schematic sectional views illustrating two typical embodiments of the hollow-fiber filter module of the present invention;

FIG. 2 illustrates, in plan and in section, a module similar to that of FIG. 1 but provided with four branch tubes;

FIGS. 5 and 6 are partially cutaway schematic sectional views illustrating modules provided with a hollow fiber supporting member;

FIGS. 7 to 10 are plan and front views illustrating several embodiments of the hollow fiber supporting member;

FIGS. 12 to 15 are partially cutaway schematic sectional views illustrating hollow-fiber filter modules provided with various types of resisting members;

FIGS. 18 and 19 are partially sectional views illustrating two modes of series connection of modules.

DETAILED DESCRIPTION OF THE PREFERRED EMBODIMENTS

The hollow-fiber filter module of the present invention will be more specifically described hereinbelow with reference to the accompanying drawings.

Figure 3:
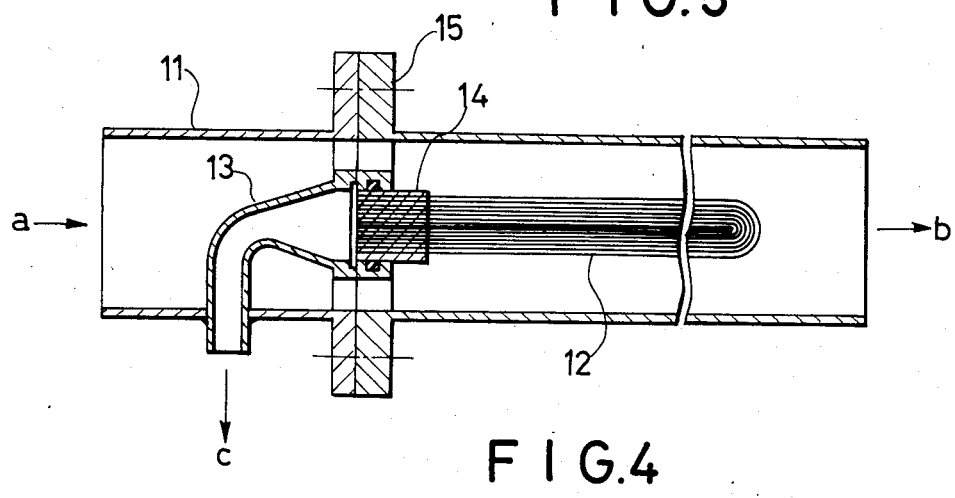

FIGS. 1 and 3 are partially cutaway schematic sectional views illustrating two typical embodiments of the hollow-fiber filter module of the present invention. In these hollow-fiber filter modules, a fluid to be treated is introduced into one end a of the straight tube, and the fluid filtered through the hollow-fiber membrane is conducted through the hollow fibers and withdrawn from the outer and c of the branch tube. On the other hand, the unfiltered fluid is discharged from the other end b of the straight tube.

In the module of FIG. 1, the branch tube 3 is located only on the outside of the straight tube 1 and one end of the branch tube 3 is joined to the sidewall of the straight tube 1. In the branch tube 3, a bundle of hollow fibers 2 is fixed by a fastening member 4 with their open ends kept clear. By means of the fastening member 4, the internal space of the branch tube is partitioned in a fluid-tight manner into a part in which the open ends of the hollow fibers are present and a part communicating with the internal space of the straight tube.

The straight tube 1 may have an equal diameter throughout its entire length, or may comprise tube segments having different diameters. In consideration of the fact that a plurality of modules are to be connected in series, both ends of each straight tube should preferably have the same diameter. However, it is to be understood that straight tubes having different diameters at both ends can be connected with the aid of properly shaped joints.

The angle ($\theta$) which the branch tube 3 makes with the straight tube 1 should preferably be in the range of 10° to 90° and more preferably 20° to 70°. This angle refers to the angle at the junction of the branch tube 3 with the straight tube 1, and the branch tube 3 may be straight or suitably bent.

The juncture of the straight tube 1 with the branch tube 3 should preferably have smooth surfaces so as not to cause damage to the hollow fibers 2, and this juncture may be tapered.

The straight tube 1 may have two or more branch tubes 3. In this case, no limitation is placed on the relative positions of the branch tubes 3. For example, the branch tubes 3 can be disposed along the circumference of a circular cross section of the straight tube 1 or disposed around the straight tube 1 in a spiral manner. FIG. 2 is an embodiment in which four branch tubes are disposed along the circumference of a circular cross section of the straight tube 1. Where the straight tube 1 has a plurality of branch tubes, a bundle of hollow fibers may be contained in all or some of the branch tubes. The outer end of a branch tube not containing a bundle of hollow fibers simply needs to be closed.

By using a straight tube having joined thereto a plurality of branch tubes each containing a bundle of hollow fibers, the flow of a fluid through the straight tube can be made more uniform from a macroscopic point of view.

Although a bundle of hollow fibers arranged in a U-shaped pattern is used in the embodiment of FIG. 1, a bundle of hollow fibers each having a closed end within the straight tube 1 may be used. The hollow fibers are disposed in such a way that they extend through the branch tube 3 into the straight tube 1 and their portion lying within the straight tube is substantially parallel to the straight tube 1. It is preferable from the viewpoint of filtering efficiency that 90% or more of the effective portion of the hollow fibers 2 lie within the straight tube 1. From the viewpoint of space efficiency, the portion of the straight tube in which no hollow fibers are present should preferably be as small as possible. Preferably, the hollow fibers 2 should be evenly distributed in any cross section of the straight tube 1, though they may be unevenly distributed for certain purposes of filtration.

Figure 4:
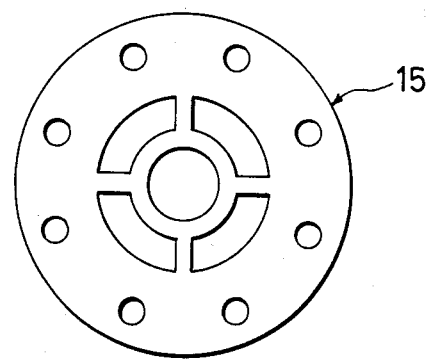
FIG. 4 is a plan view of the flange of the module of FIG. 3.

FIG. 3 is a partially cutaway schematic sectional view illustrating another embodiment of the hollow-fiber filter module of the present invention, and FIG. 4 is a plan view of the flange included therein.

In this hollow-fiber filter module, the branch tube 13 is disposed in such a way that it extends through the sidewall of the straight tube 11 and its inner end is located concentrically with the straight tube 11. Within the straight tube 11, a bundle of hollow fibers 12 is fixed to the inner end of the branch tube 13 by a fastening member 14 so as to keep the open ends of the hollow fibers clear. The internal space of the straight tube 11 and the internal space of the branch tube 13 are separated by the fastening member in a fluid-tight manner.

In the illustrated embodiment, the branch tube 13 is bent at an angle of 90°, but the angle need not necessarily be 90°. The diameter of the branch tube 13 may be equal throughout its entire length, or may vary from part to part as illustrated in FIG. 3. Preferably, the branch tube 13 is firmly fixed to the straight tube 11. In the embodiment of FIG. 3, the straight tube 11 consists of two tube segments joined to each other with the aid of a flange 15 and the inner end of the branch tube 13 is fixed to the straight tube 11 with the flange 15. However, it is to be understood that the method for fixing the branch tube 13 is not limited to that described above in FIG. 3. Preferably, the flange 15 is provided with flow channels (or openings) of adequate cross-sectional area so that the fluid can flow freely through the straight tube 1. FIG. 4 illustrates an example of the above-described flange. In this flange 15, an opening having a diameter equal to the internal diameter of the branch tube is formed in the center, and sufficiently large openings to provide effective flow channels for the fluid to be treated are formed in the region which will be situated on the outside of the branch tube and on the inside of the straight tube.

Also in this embodiment, the straight tube 11 may comprise tube segments different in diameter. Moreover, in order to increase the flow velocity locally, the straight tube 11 may be throttled to such an extent that no significant pressure loss is caused.

The hollow fibers 12 are disposed within the straight tube 11 in such a way that the greater part of each hollow fiber is substantially parallel to the straight tube 11.

The hollow fibers used as the filter membrane in the present invention should preferably be flexible. Examples of such hollow fibers include hollow fibers made of a material selected from polyolefins, fluorinated polyolefins, polysulfones, polyacrylonitrile, etc., and known to be useful for purposes of ultrafiltration or precise filtration.

The hollow fibers are bundled and fixed in a fluid-tight manner, with their open ends kept clear, by a fastening member formed by curing a potting material selected from polyurethanes, epoxy resins, unsaturated polyester resins, silicone resins, etc.

In the treatment of a fluid by use of a hollow-fiber filter module, the hollow fibers may adhere to one another and show a reduction in filtering performance due to a decrease in effective surface area. There are some effective means for preventing the hollow fibers from adhering to one another. One of them is to keep each hollow fiber in its predetermined position by use of a suitable hollow fiber supporting member, and the other is to change the flow of the fluid about the bundle of hollow fibers appropriately and thereby alter the state of bundling of the hollow fibers.

In the module of the present invention, these objects can be accomplished by installing a hollow fiber supporting member, baffle plates or the like within the straight tube.

Figure 5:
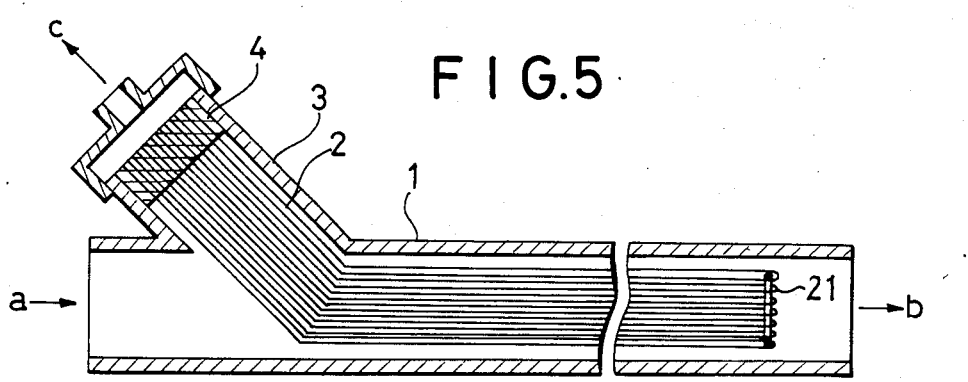

FIGS. 5 and 6 are partially cutaway schematic sectional views illustrating preferred embodiments of the module of the present invention. In these embodiments, a ring-shaped hollow fiber supporting member 21 or 22 is disposed and extended through the spaces enclosed in the U-shape portions of the hollow fibers.

A member including a part having the shape of a closed curve (such as a ring) may be suitable for use as the hollow fiber supporting member. It is preferable to use a member consisting essentially of a ring and not having any edge that might cause damage to the hollow fibers.

FIGS. 7 to 10 illustrate typical embodiments of the hollow fiber supporting member.

Figure 11:
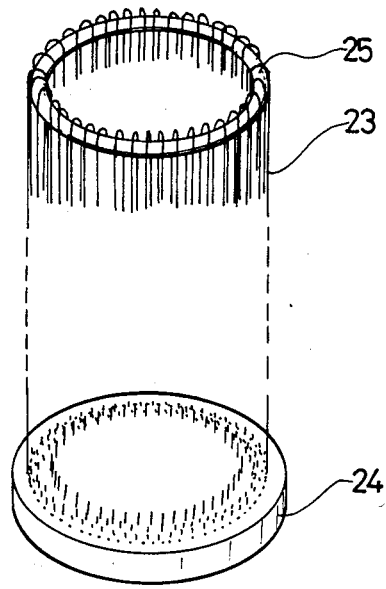
FIG. 11 is a schematic view illustrating the relationship of the hollow fiber supporting member, the hollow fibers and the fastening member in the module.

The hollow fiber supporting member illustrated in FIG. 7 is the simplest one having the shape of a ring. This hollow fiber supporting member is disposed in such a way that, as illustrated in FIG. 11, it extends through the spaces enclosed in the U-shaped portions of the hollow fibers and the hollow fibers are properly distributed along the hollow fiber supporting member.

The hollow fiber supporting member illustrated in FIG. 8 is formed by providing the ring of FIG. 7 with a plurality of vertically extending divider rods. These divider rods serve to prevent the hollow fibers from moving freely along the hollow fiber supporting member.

Figure 9A:
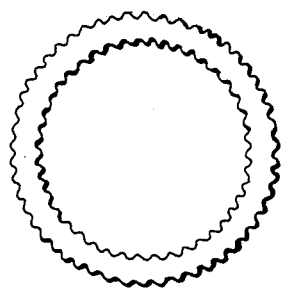
Figure 9B:
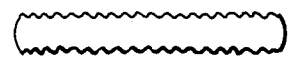

The hollow fiber supporting member illustrated in FIG. 9 comprises a ring having smooth indentations in the surfaces thereof. Like the divider rods illustrated in FIG. 8, these indentations serve to prevent the hollow fibers from moving freely along the hollow fiber supporting member.

Figure 10A:
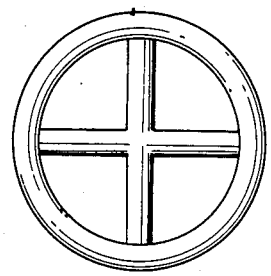
Figure 10B:

The hollow fiber supporting member illustrated in FIG. 10 is formed by providing the ring of FIG. 7 with a cross-shaped member. The hollow fibers can be more evenly distributed by extending not only the ring-shaped part but also the cross-shaped part through the spaces enclosed in the U-shaped portions of the hollow fibers.

When the tops (or U-shaped portions) of the hollow fibers are properly distributed by using any of such hollow fiber supporting members, the hollow fibers contained in the module are kept in a generally separate condition. As a result, all of the hollow fibers, rather than only the outer layer of hollow fibers, can be uniformly exposed to the fluid flowing through the straight tube of the hollow-fiber filter module. Thus, not only is the filtering efficiency improved by preventing the hollow fibers from adhering to one another, but a washing or other process for restoring their filtering function can also be achieved efficiently and uniformly.

In order to keep such a hollow fiber supporting member in position within the straight tube, it may be hung from a supporting rod installed within the straight tube or supported with a pillar. Alternatively, a hollow fiber supporting member made of a hollow pipe may be kept in position under the action of the buoyant force exerted by the fluid, or floated under the influence of the flowing fluid.

Moreover, as illustrated in FIG. 11, the hollow fibers 23 may be arranged on the fastening member 24 so as to give an annular configuration or be sparse in the center. Thus, the positional correspondence with the hollow fiber supporting member 25 permits the hollow fibers 23 to be more evenly distributed, so that all of the hollow fibers are more uniformly exposed to the fluid flowing through the straight tube.

FIGS. 12 to 15 are partially cutaway schematic sectional views illustrating other preferred embodiments of the hollow-fiber filter module of the present invention. In these embodiments, the straight tube is provided with a resisting member or members for reducing the cross-sectional area of the internal space of the straight tube.

In FIG. 12, baffle plates 26 are disposed, as resisting members, on the inner wall of the straight tube in a circumferential manner.

In FIGS. 13, 14 and 15, a spiral baffle plate (or spiral projection) 27, a static mixer 28 and a perforated plate 30 are provided, respectively, as resisting members.

All these resisting members function to cause turbulences in the fluid flowing through the straight tube containing the hollow fibers and thereby enable the hollow fibers to be uniformly exposed to the fluid.

Figure 16:
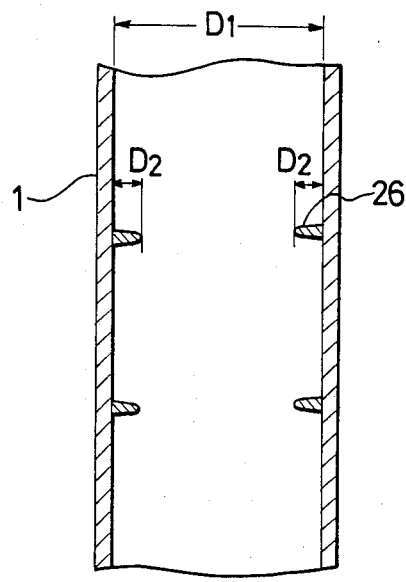
FIG. 16 is a fragmentary sectional view of the straight tube having the baffle plates used as resisting members in FIG. 12.

In the embodiment of FIG. 12, one or more baffle plates 26 comprising annular plates are disposed within the straight tube. FIG. 16 is a fragmentary sectional view of the straight tube of the hollow-fiber filter module illustrated in FIG. 12. The size of the baffle plates 26 should preferably be such that $D_2$ is equal to 3–10% of $D_1$, depending on the diameter of the hollow fibers.

In the embodiment of FIG. 13, the spiral baffle plate 27 consists of a projection disposed on the inner wall of the straight tube in a spiral manner. This spiral should preferably have an angle of 10° to 60° with respect to the straight tube. The height of the baffle plate should preferably be in the range of 5 to 20% of the diameter of the straight tube, because such a baffle plate is highly effective in causing turbulence.

In the embodiment of FIG. 14, the static mixer 28 can be any of various types of well-known static mixers. Where a static mixer is intalled within the straight tube, it is usually situated upstream of the hollow fibers.

Figure 17:
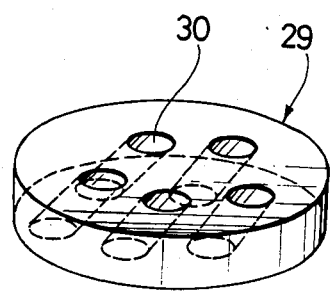
FIG. 17 is a schematic perspective view illustrating one embodiment of the perforated plate used as a resisting member in FIG. 15.

In the embodiment of FIG. 15, the perforated plate 29 comprises a disc having a diameter equal to the internal diameter of the straight tube and formed with a plurality of holes. As illustrated in FIG. 15, the perforated plate 29 is usually situated upstream of the hollow fibers. The total area of the holes 30 made in the perforated plate 29 should preferably be in the range of 10 to 70%, more preferably 10 to 50%, of the area of the perforated plate 29 without holes. When the perforated plate 29 is installed within the straight tube, the holes 30 may be parallel to the straight tube. However, it is preferable that they are inclined as illustrated in FIG. 17, because this arrangement is more effective in causing turbulence.

In some cases, the above-described resisting members may be used in combination. In addition to them, any other resisting member that can cause turbulences within the straight tube may be used in the module of the present invention.

When such resisting members are used to cause turbulences within the straight tube, all of the hollow fibers are more uniformly exposed to the fluid and, moreover, the hollow fibers are prevented from adhering to one another.

Next, the filtration method of the present invention will be more specifically described hereinafter.

According to this filtration method, a plurality of hollow-fiber filter modules as described above are connected in series through the ends of the straight tubes to form a filter module assembly and a fluid to be treated is filtered by use of this assembly. FIG. 18 illustrates an embodiment in which two modules are connected by means of a straight tube 31 and clamping members 32. In this manner, a desired number of modules can be connected to form a filter module assembly. The method of connection is not limited to that illustrated in FIG. 18 and, for example, an end of one straight tube may be directly inserted into an adjacent end of another straight tube. FIG. 19 illustrates an embodiment in which two straight tubes are connected by means of a bent tube 33 having the shape of the letter U. The use of a bent tube having an internal diameter approximately equal to or larger than that of the straight tubes makes it possible to connect them in a compact manner without increasing pressure loss. In the formation of a filter module assembly, the modules should suitably be connected in such a way that the U-shaped portion of each bundle of hollow fibers extends in the same direction. In using the filter module assembly so formed, one end of the connected straight tubes is utilized as an inlet for the fluid to be treated and the other end as an outlet for the fluid to be treated, so as to cause the U-shaped portion of each bundle of hollow fibers to lie on the downstream direction (or outlet direction) of the fluid to be treated. The filtered fluid withdrawn from the branch tube of each module may be collected by means of a suitable pipeline.

Figure 20:
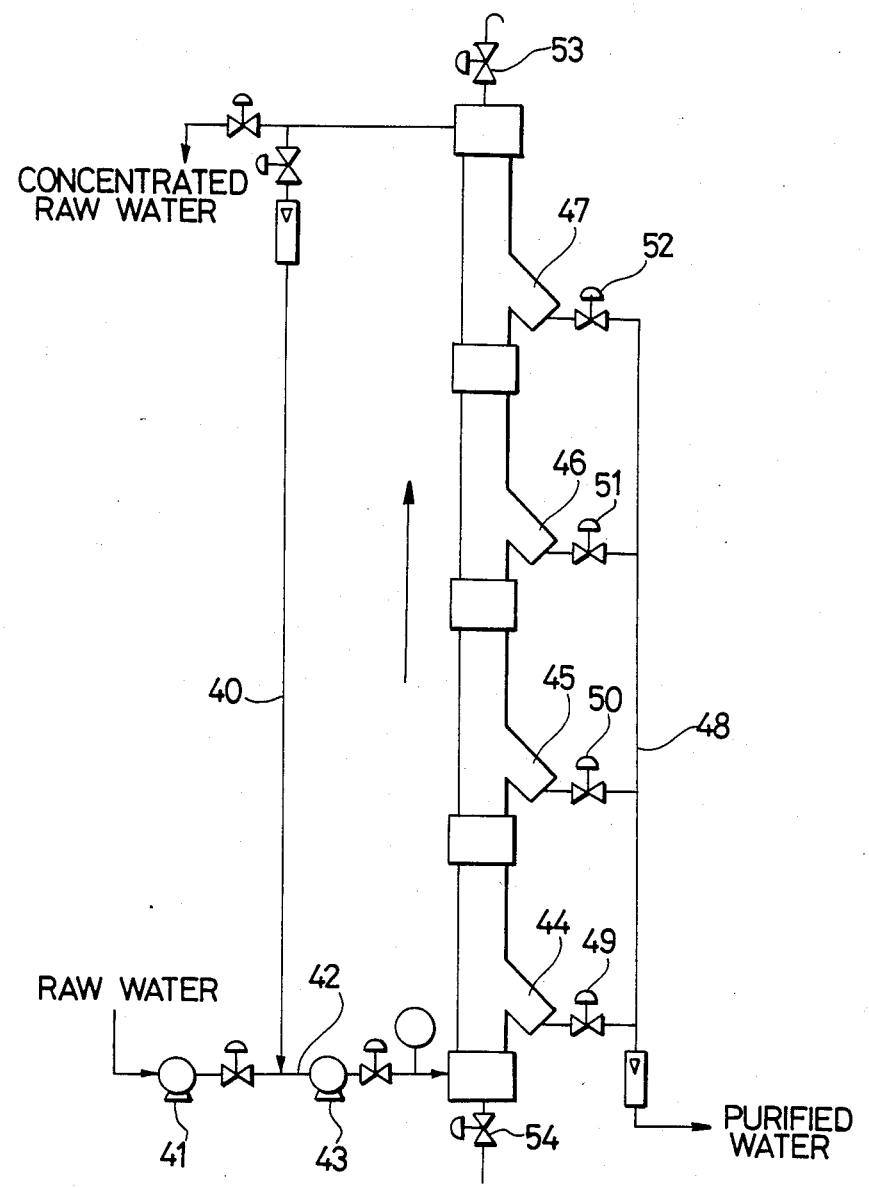
FIG. 20 is a flow chart of a filtration plant for carrying out the filtration method of the present invention.

FIG. 20 is a flow chart illustrating a filtration plant in which a filter module assembly formed by connecting four hollow-fiber filter modules of the present invention in series is combined with pumps and other incidental equipments. In this embodiment, a fluid to be treated (referred to as "raw water" in this case) is circulated through the assembly and a circulation line 40. More specifically, raw water is fed to a raw water line 42 by means of a feed pump 41 and combined with the circulating raw water. The combined raw water passes through a circulating pump 43 and enters the connected straight tubes of the assembly, where it comes into contact with the hollow fibers. The fluid filtered through the hollow-fiber membrane is withdrawn from the branch tubes 44–47 and recovered through a purified water line 48. The unfiltered raw water is conducted through the circulation line 40 and recirculated by the circulation pump 43. Between the branch tubes 44–47 and the purified water line 48 are provided valves 49–52, respectively. Only purified water of desired quality can be collected by opening the valves while monitoring the quality of the purified water. A portion of the concentrated raw water may be extracted from the circulation line, or all of the concentrated raw water having passed through the assembly once may be extracted instead of being circulated. In this type of plant, however, it is preferable to circulate water in an amount equal to at least ten times that of raw water fed to the assembly. The concentrated raw water so extracted may be fed to any other treating process or recycled to the raw water tank. The assembly is also provided with an electromagnetic de-aerating valve 53 at the top and an electromagnetic de-sludging valve 54 at the bottom.

The hollow-fiber filter module of the present invention is characterized by having a simple construction, being easy to assemble, enabling a plurality of modules to be readily connected, and exhibiting little resistance to passage of the fluid to be treated. Moreover, the hollow fibers can be effectively utilized to the fullest extent by providing the straight tube with hollow fiber supporting members, baffle plates and the like.

According to the filtration method of the present invention, partial filtration can be carried out under such conditions as to cause only a slight pressure loss of the fluid to be treated.

When a filter module assembly formed by connecting a plurality of hollow-fiber filter modules of the present invention in series is used in a vertical position, any solid matter separated by filtration falls to the bottom of the assembly and, therefore, can be readily discharged. Moreover, by introducing pressurized water with dissolving air or pressurized air from the bottom, any solid matter attached to the hollow fibers can be removed and made to fall to the bottom or rise to the surface. Furthermore, since the filtration method of the present invention causes only a slight pressure loss, the hollow fibers can be cleaned simply by increasing the flow velocity of the fluid to be treated or causing it to flow in a pulsating manner. Alternatively, the hollow fibers can also be readily cleaned with a suitable cleaning agent.

Furthermore, if bent tubes are used in the formation of a filter module assembly, it becomes possible to obtain a filter module assembly which can be compactly installed in a limited space and used to achieve efficient filtration.

In addition, the bundle of hollow fibers can be detached from each module and washed. Any desired bundle of hollow fibers or any desired module can also be replaced easily.

The hollow-fiber filter module of the present invention and the filtration method of the present invention are suitable to utilize for the filtration of water useful for various purposes, such as drinking water, industrial water, water for medical use, ultrapure water, pyrogen-free water, etc.; for the filtration of waste water from abrasion processes, oil-containing waste water, flocculant-treated water, chelate-containing water, water from biological processes, turbid water, water containing metallic powder, degreasing fluids, SS-containing solvents, etc.; for the separation and recovery of valuable metallic powders (for example, of gold and silver), flocks, etc.; for the recovery of valuable fluids in the food and pharmaceutical industries; and the like.

What is claimed is:

1. A hollow-fiber filter module comprising (a) a straight tube, and (b) at least one of a bundle of hollow fibers arranged in a U-shaped pattern and a bundle of hollow fibers each having a closed end, at least a part of each bundle of hollow fibers being disposed within said straight tube so as to be substantially parallel to said straight tube, (c) a fastening member for bundling and fixing said hollow fibers with their open ends kept clear, and (d) at least a branch tube having an end protruding to the outside of said straight tube, that surface of said fastening member which includes the open ends of said hollow fibers being attached to said branch tube in a fluid-tight manner.

2. The module of claim 1 wherein one end of said branch tube is joined to the sidewall of said straight tube and said fastening member is disposed within said branch tube in such a way that said hollow fibers extend through said branch tube into said straight tube.

3. The module of claim 2 which has a plurality of branch tubes.

4. The module of claim 1 wherein said branch tube is disposed in such a way that it extends through the sidewall of said straight tube and its inner end is located substantially concentrically with said straight tube, and said fastening member is attached to the inner end of said branch tube.

5. The module of claim 2 or 4 wherein said bundle of hollow fibers is a bundle of hollow fibers arranged in a U-shaped pattern and which further includes a hollow fiber supporting member disposed within said straight tube and extended through the spaces enclosed in the U-shaped portions of said hollow fibers so as to keep said hollow fibers in position.

6. The module of claim 2 which further includes at least a resisting member disposed within said straight tube for partially reducing the cross-sectional area of the internal space of said straight tube.

7. The module of claim 4 which further includes at least a resisting member disposed within said straight tube for partially reducing the cross-sectional area of the internal space of said straight tube.

8. The module of claim 6 wherein said resisting member comprises a projection provided on the inside wall of said straight tube.

9. The module of claim 7 wherein said resisting member comprises a projection provided on the inside wall of said straight tube.

10. The module of claim 8 or 9 wherein said projection is attached to the inside wall of said straight tube in a spiral manner.

11. The module of claim 6 or 7 wherein said resisting member comprises a perforated plate.

12. A filtration method comprising the steps of (A) providing a plurality of hollow-fiber filter modules, each of said modules comprising (a) a straight tube, and (b) at least one of a bundle of hollow fibers arranged in a U-shaped pattern and a bundle of hollow fibers each having a closed end, at least a part of each bundle of hollow fibers being disposed within said straight tube so as to be substantially parallel to said straight tube, (c) a fastening member for bundling and fixing said hollow fibers with their open ends kept clear, and (d) at least a branch tube having an end protruding to the outside of said straight tube, that surface of said fastening member which includes the open ends of said hollow fibers being attached to said branch tube in a fluid-tight manner, (B) connecting said modules in series through the ends of the straight tubes to form a filter module assembly, and (C) filtering a fluid to be treated, by utilizing one end of the connected straight tubes of said assembly as an inlet for said fluid to be treated, the other end of the connected straight tubes of said assembly as an outlet for said fluid to be treated, and the outer end of the branch tube of each module as an outlet for the filtered fluid.

* * * * *